United States Patent [19]
Nagano

[11] Patent Number: 5,400,675
[45] Date of Patent: Mar. 28, 1995

[54] BICYCLE CONTROL DEVICE

[75] Inventor: Masashi Nagano, Osaka, Japan

[73] Assignee: Shimano, Inc., Osaka, Japan

[21] Appl. No.: 200,864

[22] Filed: Feb. 22, 1994

Related U.S. Application Data

[60] Continuation of Ser. No. 15,586, Feb. 10, 1993, abandoned, which is a division of Ser. No. 925,409, Aug. 10, 1992, Pat. No. 5,241,878, which is a continuation of Ser. No. 425,281, Oct. 23, 1989, abandoned.

[30] Foreign Application Priority Data

Nov. 29, 1988 [JP] Japan .................. 63-303427
Mar. 25, 1989 [JP] Japan .................. 1-073163

[51] Int. Cl.[6] ............. G05G 11/00; F16C 1/10
[52] U.S. Cl. ................. 74/502.2; 74/471 XY; 74/489
[58] Field of Search ............. 74/489, 502.2, 471, 74/686, 689

[56] References Cited

U.S. PATENT DOCUMENTS

| | | | |
|---|---|---|---|
| 598,762 | 2/1898 | Behrens | 475/215 |
| 648,059 | 4/1900 | Sutch | 74/485 |
| 1,185,546 | 5/1916 | Rodgers | 74/286 |
| 1,666,793 | 4/1928 | Sanguineti | 74/489 |
| 1,709,346 | 4/1929 | Garrard | 475/215 |
| 2,336,682 | 12/1943 | Gross | 74/489 |
| 2,422,343 | 6/1947 | Duer | 74/282 |
| 2,490,783 | 12/1949 | Cullen | 475/280 |
| 2,745,297 | 5/1956 | Andrus | 74/689 |
| 2,789,648 | 4/1957 | Huffman | 180/66 |
| 2,796,773 | 6/1957 | Wooler et al. | 74/489 |
| 2,931,250 | 4/1960 | Ebert | 74/687 |
| 3,298,174 | 1/1967 | Stoyke et al. | 60/19 |
| 3,478,617 | 11/1969 | Maeda | 74/489 |
| 3,534,629 | 10/1970 | Schwerdhofer | 192/4 R X |
| 3,554,158 | 1/1971 | Shimano | 74/489 X |
| 3,567,250 | 3/1971 | Wolf | 280/289 |
| 3,595,351 | 7/1971 | Ishida | 74/506 X |
| 3,605,522 | 9/1971 | Grosseau | 74/689 |
| 3,808,907 | 5/1974 | Yamaguchi | 74/471 X |
| 3,934,492 | 1/1976 | Timbs | 74/740 |
| 4,002,350 | 1/1977 | Timbs | 192/4 R |
| 4,100,820 | 7/1978 | Evett | 192/4 R |
| 4,132,296 | 1/1979 | Evett | 74/489 X |
| 4,319,673 | 3/1982 | Kojima | 192/4 R |

FOREIGN PATENT DOCUMENTS

| | | | |
|---|---|---|---|
| 1007339 | 2/1952 | France | 74/502.2 |
| 3136922 | 3/1983 | Germany | 74/502.2 |
| 561377 | 4/1957 | Italy | 74/502.2 |
| 567858 | 10/1957 | Italy | 74/502.2 |
| 134931 | 11/1919 | United Kingdom | 74/502.2 |
| 2135028 | 8/1984 | United Kingdom | 74/502.2 |

Primary Examiner—Vinh T. Luong
Attorney, Agent, or Firm—Dickstein, Shapiro & Morin

[57] ABSTRACT

A control device attachable to the handlebar of a bicycle for controlling a brake mechanism and speed mechanism. The control device comprises a bracket fixed to the handlebar and a brake lever pivotable crosswise relative to the bracket. The brake mechanism is controlled by fore and aft pivotal movement of the brake lever, while the speed change mechanism is controlled by sideways pivotal movement of the brake lever.

6 Claims, 15 Drawing Sheets

BICYCLE CONTROL DEVICE

This application is a continuation of application Ser. No. 08/015,586, filed Feb. 10, 1993, now abandoned, which is a division of application Ser. No. 07/925,409, filed Aug. 10, 1992, now U.S. Pat. No. 5,241,878, which is a continuation of application Ser. No. 07/425,281, filed Oct. 23, 1989, now abandoned.

BACKGROUND OF THE INVENTION (1) Field of the Invention

The present invention relates to a bicycle control device for carrying out braking speed change functions.

(2) Description of the Prior Art

Control devices of this type are disclosed in U.S. Pat. Nos. 3,478,617 and 4,100,820, for example. For effecting braking and speed change, these known devices comprise a speed change lever pivotally connected to a brake control unit including a brake lever and a fixing member connecting the brake lever to a handlebar.

The known devices have large and complicated constructions which are expensive to manufacture, since the speed change lever is specially provided besides the brake lever. Moreover, a speed change operation is possible only after a rider's hand off the brake lever. The known devices have the further disadvantage that the speed change lever projects to an obstructive extent from the brake control unit, and the cyclist could have a finger caught and injured by the speed change lever.

SUMMARY OF THE INVENTION

The present invention has been made having regard to the state of the art noted above, and its object is to provide a compact and inexpensive bicycle control device which allows the cyclist to carry out braking and speed change operations without changing his or her hold from one lever to another and without the possibility of injuring his or her finger.

The above object is achieved, according to the present invention, by a control device for a bicycle having a brake mechanism and a speed change mechanism, comprising a brake lever assembly mounted on a handlebar for controlling the brake mechanism, wherein the speed change mechanism is controllable by movement of at least a portion of the brake lever assembly.

In a preferred embodiment of the invention, the brake lever assembly is pivotable in one direction to control the brake mechanism and swingable in another direction to control the speed change mechanism. Specifically, the brake lever assembly is pivotable in one direction to pull a brake wire connected to the brake mechanism and swingable in another direction to wind up a speed change wire connected to the speed change mechanism.

The control device may further comprise a control lever, in which case the brake lever assembly is swingable in the other direction to wind up the speed change wire, which brake lever assembly returns to an original position upon release, and the control lever is swingable to rewind the speed change wire, which control lever returns to an original position upon release.

The brake lever assembly may include an intermediate or proximal portion swingably mounted on a support shaft.

According to the present invention, the cyclist may decelerate the bicycle running speed by operating the brake lever assembly, and may also control the speed change mechanism by selecting a desired gear ratio without removing his or her hand from the brake lever member.

Switching between brake mechanism and speed change mechanism may be carried out mechanically or electrically by utilizing a push button mechanism. The electric push button switching system is advantageous particularly where the invention is applied to the type of bicycle that drives the brake and speed change mechanisms electrically.

The purely mechanical switching system, in which speed change is effected by swinging the brake lever assembly in a direction different from the direction of pivotal braking movement thereof, requires only a lever and no other component such as a push button. This realizes a simple and compact construction which may be designed to have an excellent outward appearance. Since there is no additional lever projecting laterally of the control device, there is no possibility of fingers becoming caught and injured by such a lever.

The control device may further comprise a control lever as noted above, in which case the brake lever assembly is swingable to shift the speed change gear in one direction, which brake lever assembly returns to an original position upon release, and the control lever is swingable to shift the speed change gear in another direction, which control lever also returns to an original position upon release. Although two change levers are provided in this case, the lever positions prior to a speed change operation are constantly fixed, and it is therefore simple to swing the levers over the same stroke with a hand regardless of the current speed ratio.

Where a pivotal axis for speed change is provided at the proximal portion of the brake lever assembly, speed change may be effected without shifting a grip from the brake lever assembly. Where this pivotal axis is provided at the intermediate portion, braking may be effected with the first and second fingers, and speed change with the third and fourth fingers, thereby facilitating a speed change operation along with braking. Where the pivotal axis is provided on the bracket, the latter may be configured to facilitate gripping and may project forwardly from a curved portion of a dropped handlebar. This construction allows the cyclist to effect speed change only by twisting his or her hand holding the bracket.

Other features and advantages of the invention will be apparent from the following description.

DETAILED DESCRIPTION OF THE PREFERRED EMBODIMENTS

Figure 1:
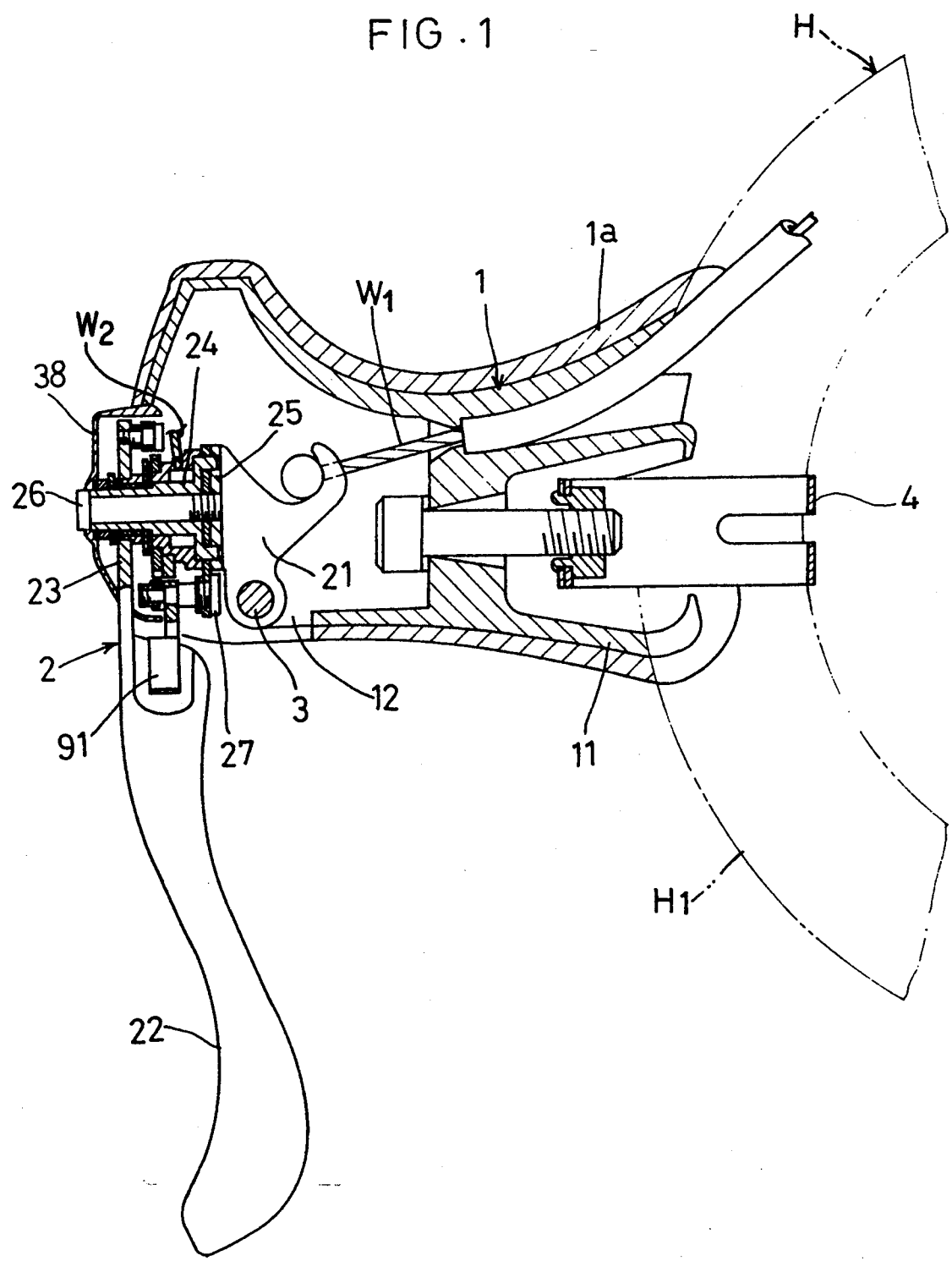
FIG. 1 is a front view in vertical section of a control device embodying the present invention.

In the drawings, reference numeral 1 indicates a box-like bracket shaped to facilitate gripping, and including a fixing portion 11 secured to a bicycle handlebar H and a lever support 12. Numeral 2 indicates a brake lever assembly including a base 21 connected to the lever support 12 through a lever axis 3, and a lever member 22, to be pivotable relative to the bracket 1 between a braking position and an inoperative position. In application to a dropped handlebar, for example, the bracket 1 is secured through a band element 4 to an approximately C-shaped curved section H1 extending forwardly, then downwardly and rearwardly from an end of a straight bar section of the dropped handlebar H extending transversely of the bicycle. The bracket 1 projects forwardly from the curved section H1. The base 21 of the brake lever assembly 2 defines an axis bore 21a and a wire hook 21b at one end thereof. The lever member 22 is continuous with the base 21 through an intermediate portion 23. The lever member 22 is opposed to and extends downwardly along a foremost portion of the curved section H1, to be operable by the hand holding the bracket member 1 and curved section H1. The wire hook 21b engages one end of a brake wire W1.

In a first embodiment of the invention shown in FIGS. 1 through 8, the brake lever assembly 2 is divided at a position between the base 21 and intermediate portion 23, the base 21 includes a support shaft 24 extending perpendicular to the lever axis 3 for rotatably supporting the intermediate portion 23. Thus the lever member 22 continuous with the intermediate portion 23 is swingable, for effecting speed change, in a direction perpendicular to the pivotal movement of the brake lever assembly 2.

More particularly, the base 21 includes support plates 25 secured to a wall thereof opposed to the intermediate portion 23, the support plates 25 extending in the same direction as the lever member 22. The support shaft 24 is removably attached to the support plates 25 by a fixing screw 26. The support shaft 24 rotatably supports, besides the intermediate portion 23, an approximately cylindrical wire takeup element 5 including a wire engaging portion 51 and urged in a wire-unwinding direction by a return spring 6. The brake lever assembly 2 further includes a position maintaining mechanism 7, a transmission element 8 and a position control mechanism 9 disposed between the intermediate portion 23 and takeup element 5. The position maintaining mechanism 7 includes a plurality of engaging portions 71 for positioning the takeup element 5 stepwise, and an engaging element 72 for engaging the engaging portions 71 to maintain the takeup element 5 in selected positions. The transmission element 8 transmits operating force from the lever member 22 to the takeup element 5. The position control mechanism 9 includes a control lever 91 for controlling the engagement between the engaging element 72 and engaging portions 71 and releasing the takeup element 5 to make a return movement. The control lever 91 is pivoted to a pivotal axis 27 extending parallel to the support shaft 24 from one of the support plates 25. The support shaft 24 supports a position setter 10 which is not rotatable relative to the support shaft 24 and defines a first setting portion 10a for setting a starting position of the lever member 22. A lever spring 20 is interposed between the intermediate portion 23 and support shaft 24 for returning the lever member 22 to the starting position. The takeup element 5 defines a second setting portion 52 for setting a starting position of the control lever 91. A lever spring 30 is interposed between the control lever 91 and support plate 25 for returning the control lever 91 to its starting position.

The intermediate portion 23 has a flat plate shape opposed to the base, defining a bore 23a for receiving the support shaft 24, and an abutment 23b for contacting the first setting portion 10a of the position setter 10 when the lever member 22 is at the starting position. Further, the intermediate portion 23 pivotally supports the claw-like transmission element 8, with a spring 31 mounted therebetween for urging the transmission element 8 in one direction.

The support shaft 24 has a cylindrical shape, and the proximal end of the support shaft 24 and support plates 25 are positionally variable in the circumferential direction of the support shaft 24 by means of a plurality of engaging projections and recesses and rigidly interconnected by the fixing screw 26. The support shaft 24 defines, on the outer peripheral surface adjacent a distal end thereof, a plurality of axial grooves 24a and a screw thread. The screw thread is engageable with a nut 32 for retaining the intermediate portion 23 and takeup element 5 on the support shaft 24. The return spring 6 is mounted between the proximal end of the support shaft 24 and the takeup element 5. The grooves 24a of the support shaft 24 receive a spring bearing plate 33 to be unrotatable relative to the support shaft 24, the spring bearing plate 33 having a bearing piece 33a for supporting one end of the lever spring 20 and a release portion 33b for disengaging the transmission element 8 from the takeup element 5 when the lever member 22 returns to the starting position. One of the support plates 25 fixed to the base 21 defines a threaded bore for engaging the fixing screw 26, while the other support plate 25 supporting the pivotal axis 27 defines an unthreaded bore through which the fixing screw 26 extends.

The takeup element 5 has a cylindrical shape defining a wire engaging portion 51 laterally thereof. The takeup element 5 includes the engaging portions 71, a plurality of driven portions 53 and a plurality of control recesses 54 peripherally of one axial end thereof. The driven portions 53 are contactable by the transmission element 8 to transmit the operating force resulting from a forward movement of the lever member 22. The takeup element 5 further defines a wire guide groove 55 peripherally of an intermediate position thereof, which is continuous with the wire engaging portion 51. The engaging portions 71, driven portions 53 and control recesses 54 may be formed integral with the takeup element 5, but are provided separately from the takeup element 5 in the illustrated example. Specifically, the takeup element 5 supports a semicircular position setting plate 56 and a disk-shaped turn plate 57 adjacent to each other. The two plates 56 and 57 are made unrotatable relative to the takeup element 5 through engagement with two interlock portions 5a and 5b arranged axially at one end of the takeup element 5 and including projections spaced apart peripherally thereof, respectively. The position setting plate 56 defines the engaging portions 71 spaced apart peripherally thereof, and the bottom faces of these engaging portions 71 defining the second setting portion 52. The turn plate 57 defines the driven portions 53 spaced apart along one peripheral section thereof, and the control recesses 54 displaced by half pitches along an opposite peripheral section relative to the driven portions 53.

The engaging member 72 of the position setting mechanism 7 is formed integral with the control lever 91 and includes a claw at an extreme end thereof. The pawl is engageable with the engaging portions 71 and, when the takeup element 5 rotates in the wire winding direction, is movable with the control lever 91 away from the engaging portions 71 against the lever spring 30.

The position control mechanism 9 includes the control lever 91 and engaging member 72. Forward movement of the control lever 91 disengages the engaging member 72 from the engaging portions 71, whereupon the return spring 6 rotates the takeup element 5. Further, the pawl at the end of the engaging member 72 may contact the second setting portion 52 to stop the control lever 91 at the starting position. The control lever 91 defines a contact portion 92 laterally of the proximal end thereof opposite the engaging member 72, for engaging an outer periphery of the position setting plate 56 to limit the forward pivoting range. Instead of being supported on the pivotal axis 27, the control lever 91 may be pivotably supported on the position setter 10 or the spring bearing plate 33 attached to the distal portion of the support shaft 24.

The pivotal axis 27 supports, besides the control lever 91, a limiter pawl 34 for engaging the control recesses 54 to prevent the takeup element 5 from returning in an amount exceeding the interval between the engaging portions 71 when the control lever 91 is moved forward. A pawl spring 35 is mounted between the limiter pawl 34 and pivotal axis 27 for constantly urging the limiter pawl 34 toward the control recesses 54. The limiter pawl 34 includes an engaging projection 34a projecting from a proximal end thereof toward the engaging member 72. The control lever 91 includes a stopper 36 for contacting the engaging projection 34a when the control lever 91 is at the starting position, for disengaging the limiter pawl 34 from the control recesses 54.

The intermediate portion 23 defines a lateral recess 23c for receiving the control lever 91 when the latter is operated.

The lever support 12 includes a sleeve support 37 at one end thereof for supporting an outer sleeve 0 which guides a change speed wire W2 engaged by the wire engaging portion 51 of the takeup element 5.

Numeral 38 indicates a bowl-shaped cover for covering the proximal portion of the intermediate portion 23 and the proximal portions of the takeup element 5 and control lever 91.

When braking the bicycle with a hand holding the lower extreme position of the curved portion of the dropped handlebar H, the cyclist may extend the index and middle fingers, for example, of the hand holding the curved portion, hook the lever member 22 of the brake lever assembly 2 and draw the lever member 22 toward the braking position, i.e. toward the curved portion.

This lever operation causes the brake lever assembly 2 to pivot on the lever axis 3 with the base 21 and intermediate portion 23 rigidly interconnected through the support shaft 24 and support plates 25. This pivotal movement of brake lever assembly 2 pulls the brake wire W1 thereby to brake the bicycle. After the pivoting operation of the brake lever assembly 2, the cyclist may swing the lever member 22 about the support shaft 24 in a direction perpendicular to the direction of the pivotal movement, i.e. transversely of the brake lever assembly 2, without removing the fingers from the lever member 22. As a result, the takeup element 5 is rotated to provide a low speed. Alternatively, after the pivoting operation of the brake lever assembly 2, the cyclist may remove the fingers from the lever member 22 and swing the control lever 91 about the pivotal axis 26 in the same direction as the lever member 22. Then the takeup element 5 is rotated under the force of return spring 6, thereby providing a high speed.

When braking the bicycle with a hand holding the bracket 1 fixed to the handlebar H, the cyclist may extend the index, middle and ring fingers of the hand holding the bracket 1 along the brake lever assembly 2, hook the lever member 22 and draw the lever member 22 toward the braking position, i.e. toward the curved portion H1. This operation causes the brake lever assembly 2 to pivot on the lever axis 3 with the base 21 and intermediate portion 23 rigidly interconnected through the support shaft 24 and support plates 25. After the pivoting operation of the brake lever assembly 2, the cyclist may swing the lever member 22 about the support shaft 24 in the direction perpendicular to the direction of the pivotal movement, i.e. transversely of the brake lever assembly 2, without removing the fingers from the lever member 22. As a result, the takeup element 5 is rotated to provide a low speed. Alternatively, after the pivoting operation of the brake lever assembly 2, the cyclist may remove the fingers from the lever member 22 and swing the control lever 91 about the pivotal axis 26 in the same direction as the lever member 22. Then the takeup element 5 is rotated under the force of return spring 6, thereby providing a high speed.

As described above, the change speed operation may be effected in a continuous manner without removing the fingers from the brake lever assembly 2, whether the cyclist is holding the curved portion of the handlebar or the bracket 1 fixed to the curved portion. Thus, even when a change speed operation is effected immediately after decelerating the bicycle by operating the brake lever assembly 2, switching is made from the braking operation to the speed change operation with a minimal time lag and bicycle running speed is controlled properly.

The change speed operation will be described next.

Figure 2:
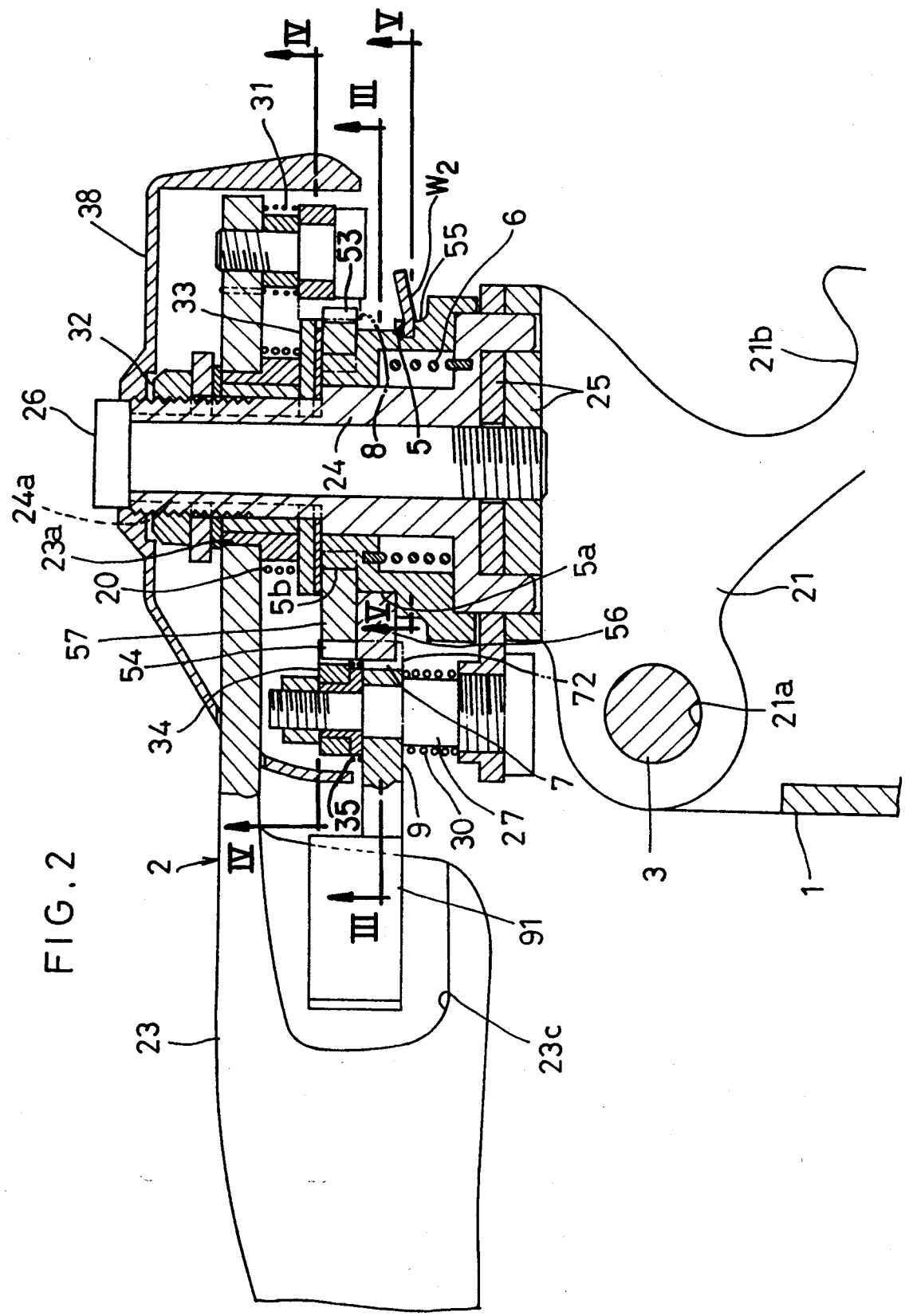
FIG. 2 is a fragmentary enlarged sectional view of the control device.
Figure 3:
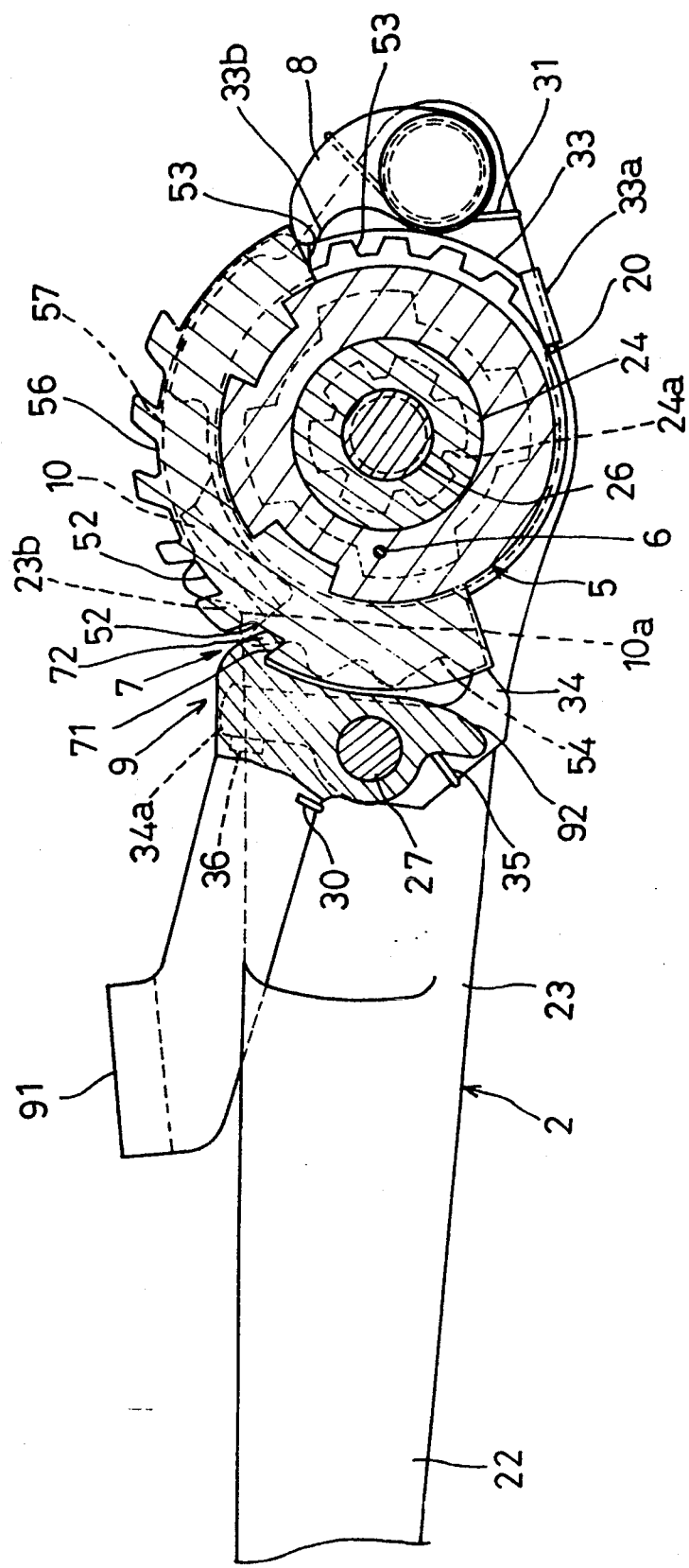
FIG. 3 is a section taken along a line III—III of FIG. 2.
Figure 5:
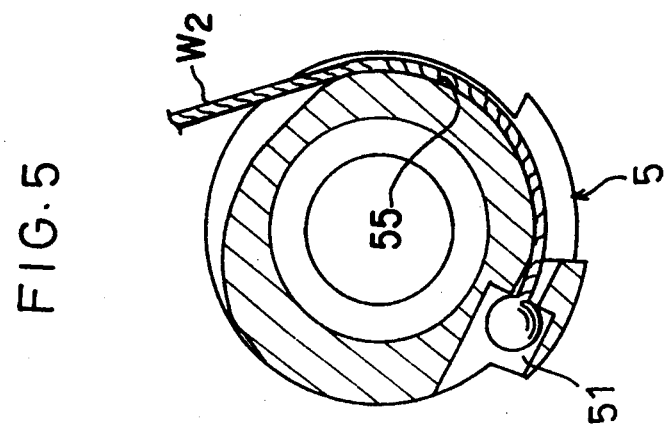
FIG. 5 is a section taken along a line V—V of FIG. 2, FIGS. 6–8 are sectional views corresponding to FIG. 3.
Figure 4:
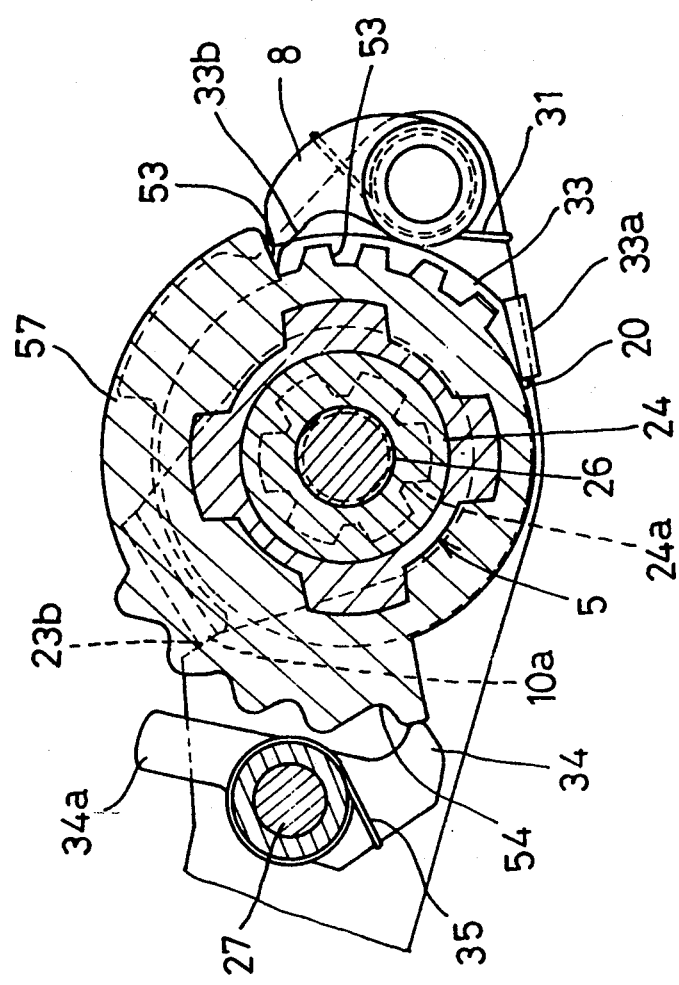
FIG. 4 is a section taken along a line IV—IV of FIG. 2.
Figure 6:
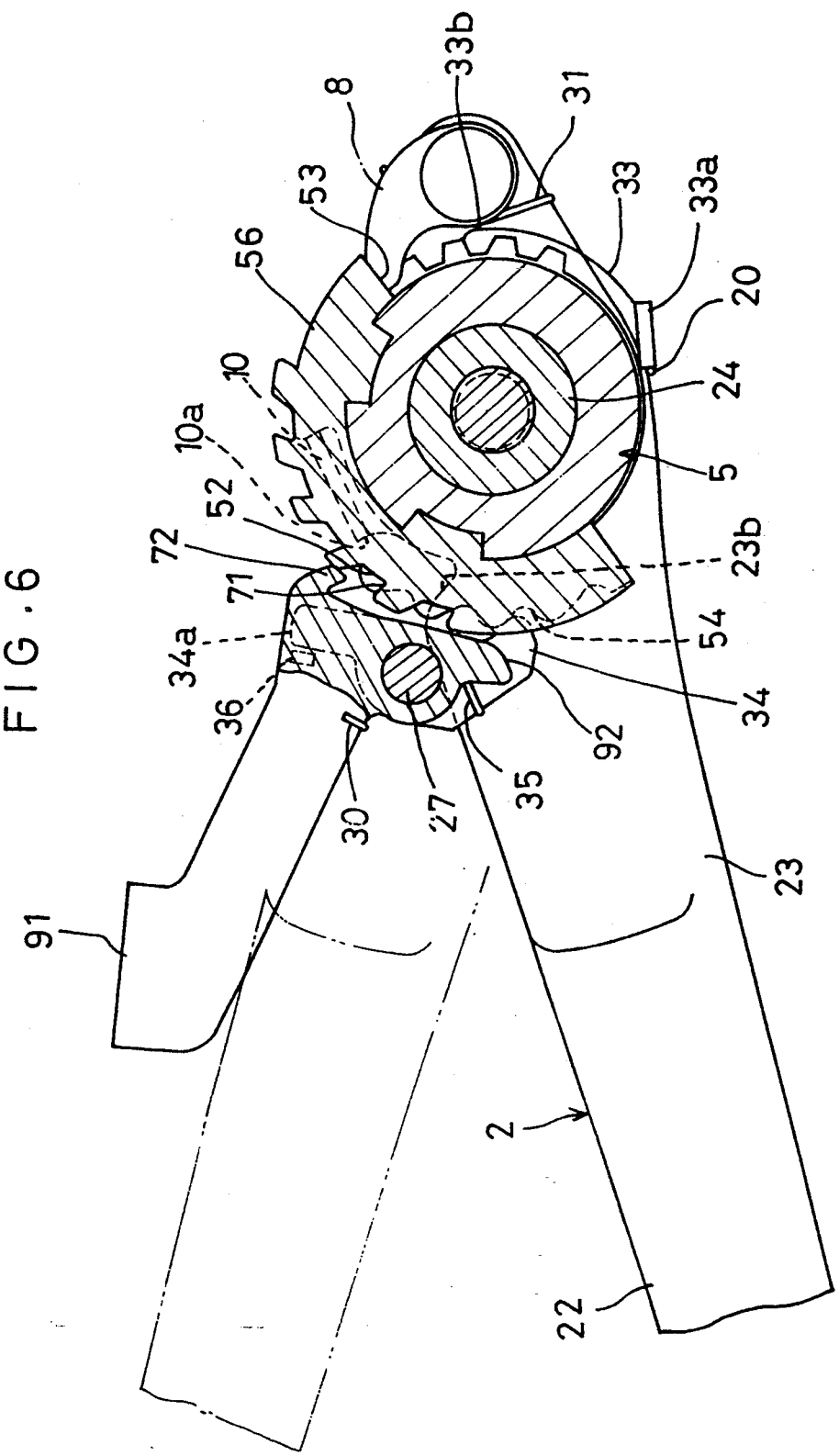
Figure 7:
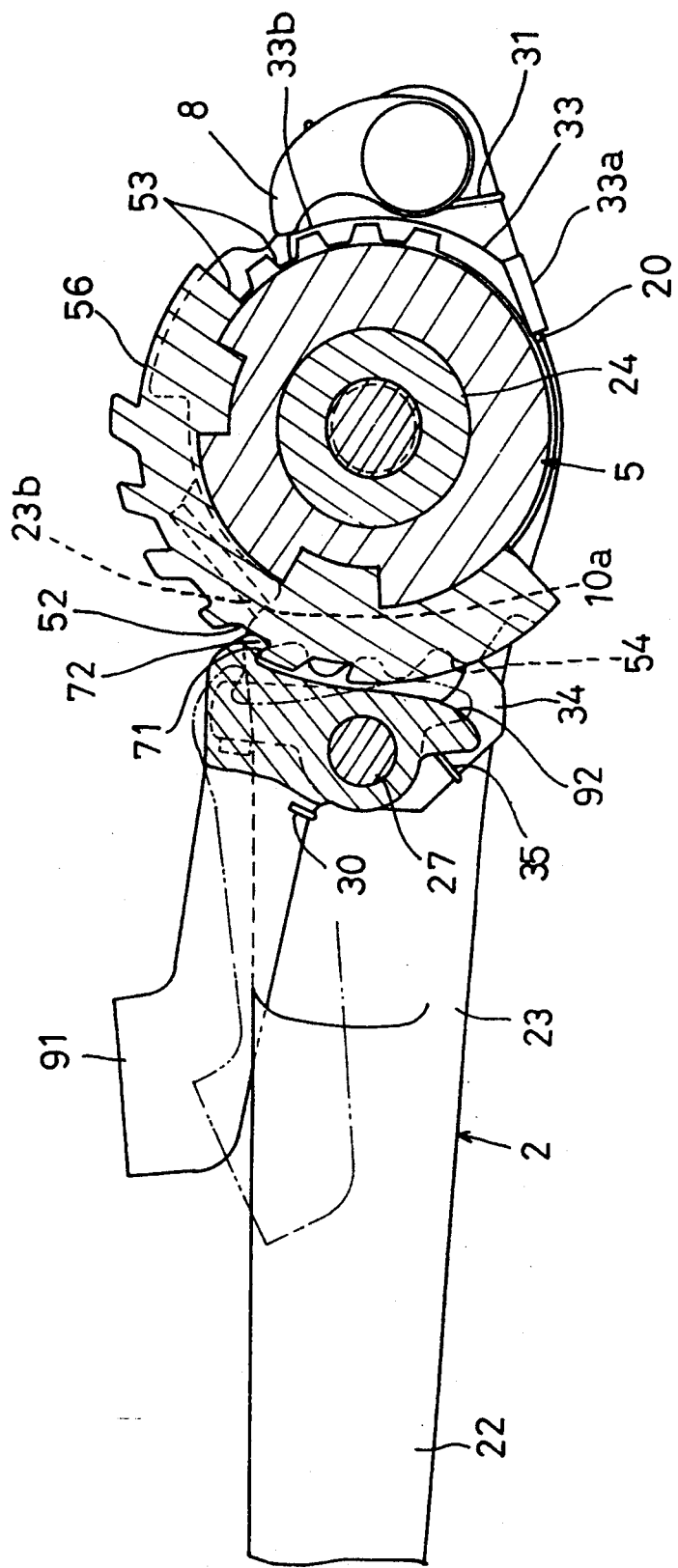

FIGS. 2 and 3 show a high speed state, in which the lever member 22 is urged by the lever spring 20 to stay at the starting position or inoperative position opposite the foremost portion of the curved portion H1, with the abutment 23b of the intermediate portion 23 continuous with the lever member 22 contacting the first setting portion 10a of the first setter 10. The transmission element 8 has the distal end thereof contacting the release portion 33b of the spring bearing plate 33. The control lever 91 is urged by the lever spring 30 to stay at the starting position, with the extreme end of the engaging member 72 integral with the control lever 91 contacting the second setting portion 52 defined on the bottom faces of the engaging portions 71. When the cyclist moves fingers of the hand holding the curved portion H1 or bracket 1 to the lever member 22 and swings the lever member 22 forward counterclockwise from the position shown in FIG. 3 to the position shown in FIG. 6, the transmission element 8 becomes disengaged from the release portion 33b and, under the force of the spring 31, engages one of the driven portions 53 of the takeup element 5, whereby the operating force is transmitted from the lever member 22 to the takeup element 5 to rotate the takeup element 5 counterclockwise for pulling the control wire. A first speed is provided when the lever member 22 is swung forward by a stroke corresponding to one pitch of the engaging portions 71, and a second speed is provided when the stroke corresponds to two pitches. Speed change may be effected with a single operation using the fingers step by step or straight up to a third speed. For providing a fourth and further speeds, the lever member 22 is once returned to the starting position, and swung all over again to effect a speed change step by step or straight to a selected speed. When a selected low speed position is attained, the engaging member 72 engages a selected one of the engaging portions 71 as shown in FIG. 7, for preventing return rotation of the takeup element 5 to positively maintain the low speed position. When the lever member 22 is released after the above change speed operation, the lever member 22 returns clockwise in FIG. 6 under the force of lever spring 20, and stops at the starting position as shown in FIG. 7, with the abutment 23b contacting the first setting portion 10a, to be ready for a next operation. The transmission element 8 becomes disengaged from the driven portions 53, by the distal end thereof contacting release portion 33b of the spring bearing plate 33. When the lever member 22 is swung forward, the transmission element 8 moves out of contact with the release portion 33b and, under the urging force of spring 31, engages one of the driven portions 53.

Where five or six speeds are provided, a change may be made smoothly from high speed to low speed by pushing the lever member 22 forward twice with fingers.

Figure 8:
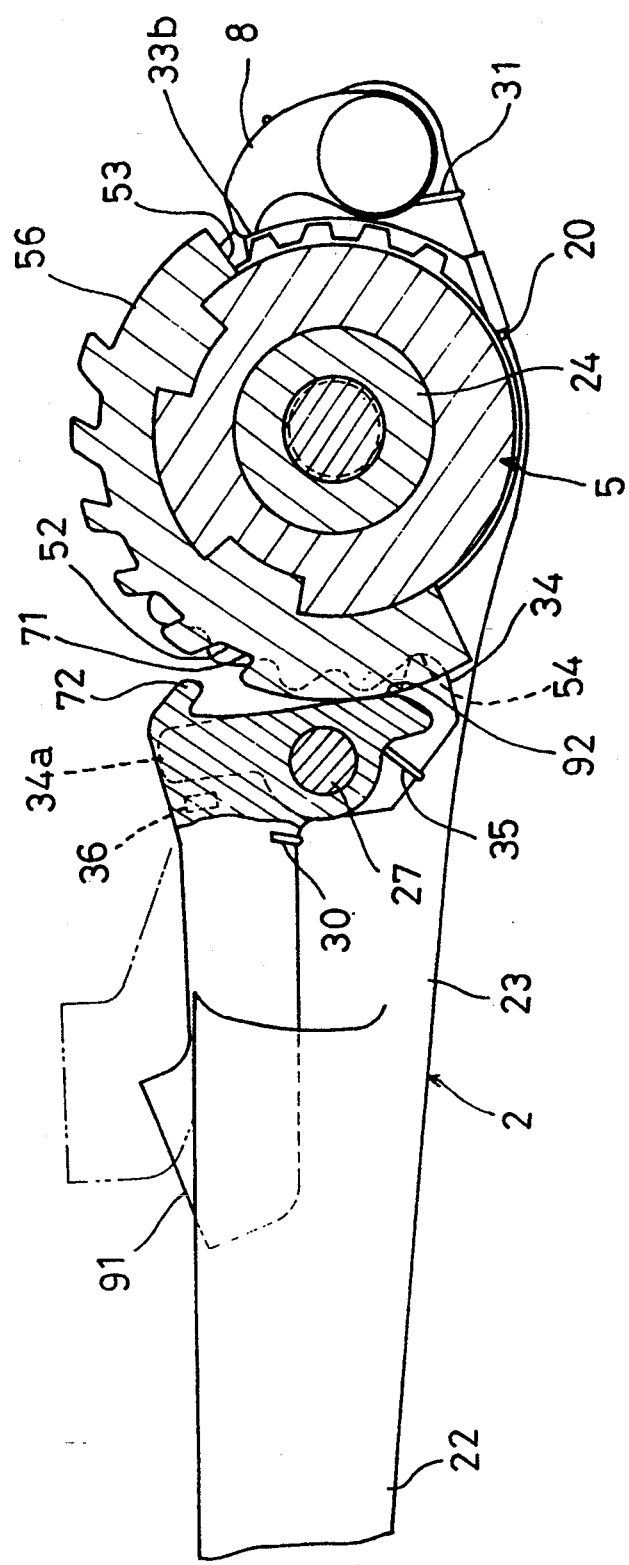

For effecting a change from the low speed position shown in FIG. 7 to a high speed position again, the cyclist moves fingers of the hand holding the curved portion H1 or bracket 1 to the control lever 91 at the starting position, and swings the control lever 91 counterclockwise from the position shown in FIG. 3, i.e. in the same direction as the lever member 22. As a result, the engaging member 72 provided on the control lever 91 moves out of engagement with the engaging portions 71, and the takeup element 5 rotates a predetermined amount under the force of return spring 6. At this time, the limiter pawl 34 contacts one of the control recesses 54 of the takeup element 5 as shown in FIG. 8, thereby controlling the amount of return of the takeup element 5 under the force of the return spring 6. When the control lever 91 is released, the control lever 91 returns under the force of lever spring 30, causing the stopper 36 to contact the engaging projection 34a of the limiter pawl 34, whereby the limiter pawl 34 disengages from the control recess 54. The takeup element 5 returns under the force of return spring 6 before the engaging member 72 engages one of the engaging portions 71. Subsequently, the engaging member 72 engages the engaging portion 71 corresponding to a next lower speed. This engagement stops the return movement of the takeup element 5 under the force of return spring 6, thereby positively maintaining the selected high speed position. The control lever 91 having returned stops at the starting position as shown in FIG. 3, with the distal end of the engaging member 72 contacting the second setting portion 52, to be ready for a next operation. When the control lever 91 having stopped at the starting position is swung forward again, the engaging member 72 disengages from the engaging portion 71 as in the preceding operation, with the takeup element 5 rotating backward under the force of return spring 6, thereby further relaxing the wire to provide a still higher speed. When the control lever 91 is released, the engaging member 72 engages the engaging portion 71 corresponding to a next lower speed, thereby positively maintaining the takeup element 5 in a returned position. The control lever 91 having returned stops at the starting position as shown in FIG. 3, with the distal end of the engaging member 72 contacting the second setting portion 52. A change from this low speed position to a higher speed position requires the control lever 91 to be swung forward the number of times corresponding to the number of speeds provided, since the amount of return movement of the takeup element 5 is controlled by the limiter pawl 34 engaging the respective control recesses 54 at every pitch of the engaging portions 71. However, the limiter 34 may be omitted from the construction, in which case the engagement between the engaging member 72 and engaging portions 71 is controlled based on extents to which the control lever 91 is operated, to rotate the takeup element 5 step by step or straight to a position corresponding to a selected speed.

Figure 9:
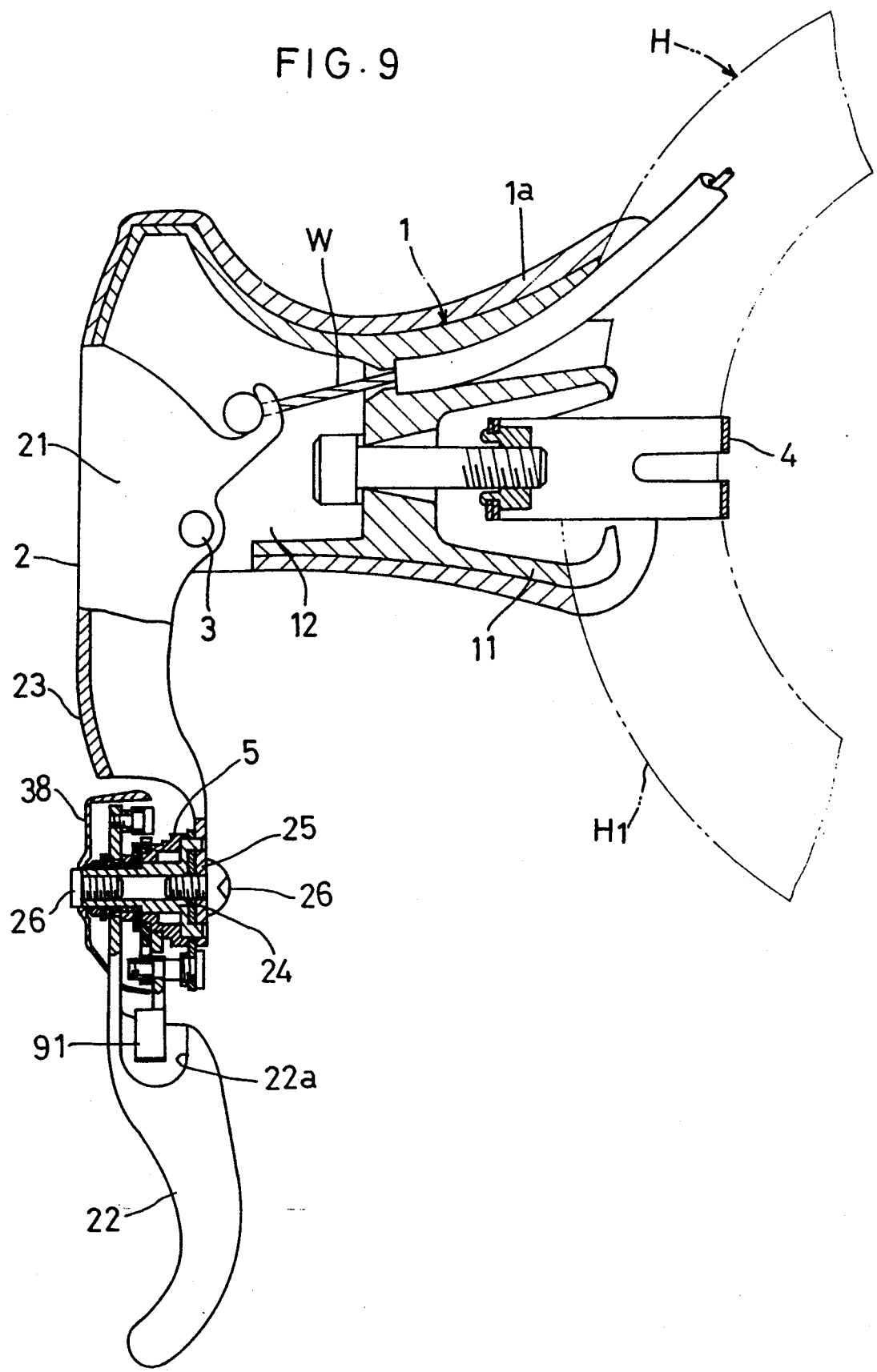
FIG. 9 is a front view in vertical section of a second embodiment of the invention.
Figure 10:
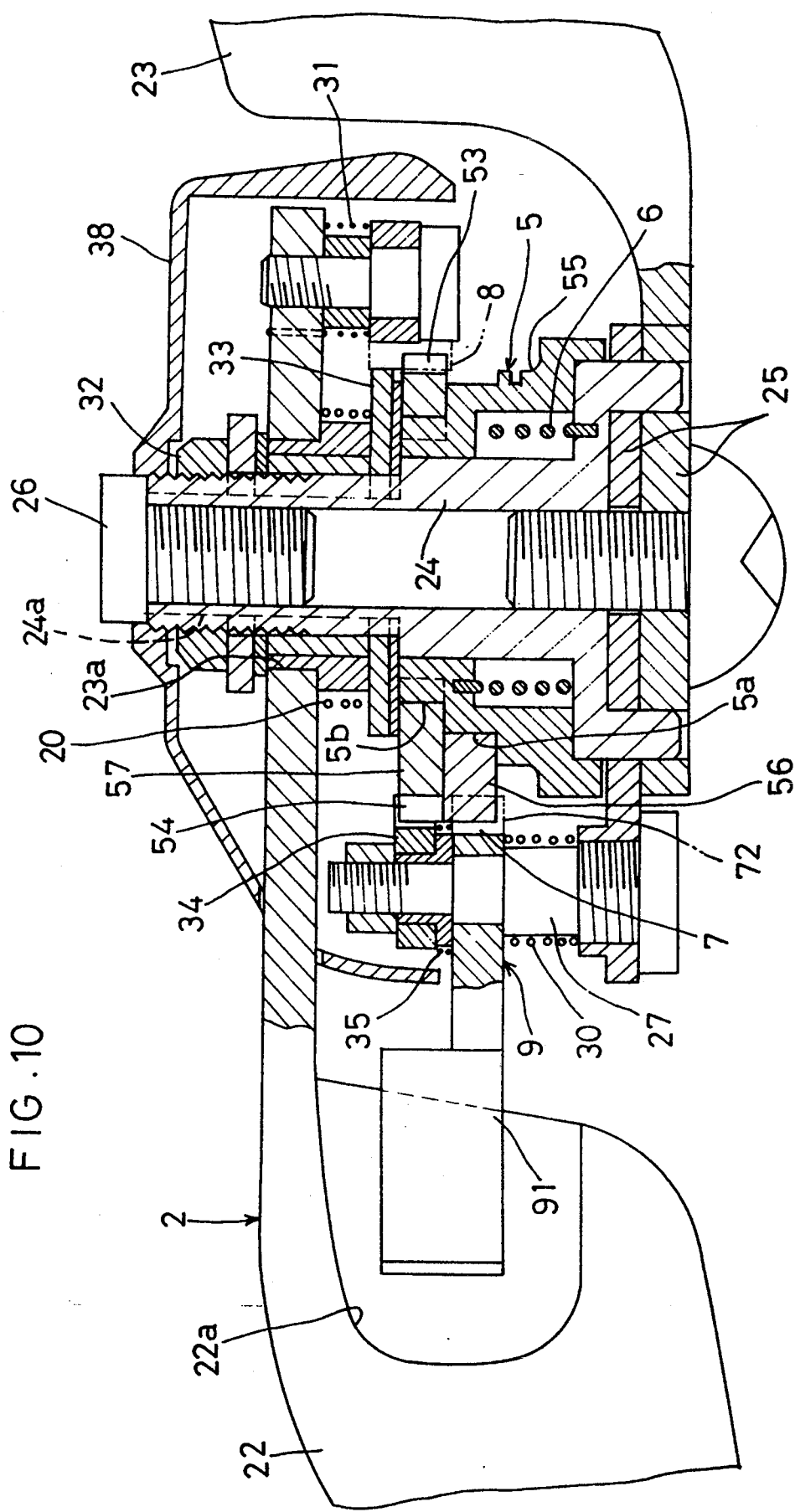
FIG. 10 is an enlarged sectional view of a principal portion of the second embodiment.

Next, a second embodiment of the invention will be described with reference to FIGS. 9 and 10.

The second embodiment is basically the same as the first embodiment, and only the different points will be described here.

In the second embodiment, the brake lever assembly 2 comprises a lever member 22 and an intermediate portion 23 formed separately from each other. The lever member 22 includes a flat plate portion opposed to an end edge of the intermediate portion 23 to which support plates 25 are secured. A support shaft 24 is removably attached to the support plates 25 by a fixing screw 26. The support shaft 24 rotatably supports a wire takeup element 5 along with the flat plate portion of the lever member 22. A position maintaining mechanism 7 is provided between the lever member 22 and takeup element 5. The lever member 22 includes a transmission element 8. A lever spring 20 is mounted between the lever member 22 and support shaft 24. Thus, the lever member 22 is swingable, to effect change speed, in a direction perpendicular to the direction of pivotal movement of the brake lever assembly 2.

The lever member 22 defines a lateral recess 22a for receiving the control lever 91 when the latter is operated.

The takeup element 5 includes a wire engaging portion 51 for engaging a change speed wire W1 which is guided by the outer sleeve 0 to extend through the interior of the intermediate portion 23.

In the second embodiment, as in the first embodiment, the brake lever assembly 2 is pivotable to the braking position with a hand holding the curved portion H1 or bracket 1. The brake lever assembly 2 makes a pivotal movement on the lever axis 3 with the lever member 22 and intermediate portion 23 rigidly interconnected through the support shaft 24 and support plates 25. This pivotal movement of brake lever assembly 2 pulls the brake wire W1 thereby to brake the bicycle. The lever member 22 may be swung forward from the starting position to provide a selected low speed, and returns to the starting position under the force of lever spring 20 upon release. The control lever 91 may be swung forward from its starting position to provide a selected high speed, and returns to the starting position under the force of lever spring 30 upon release.

Figure 11:
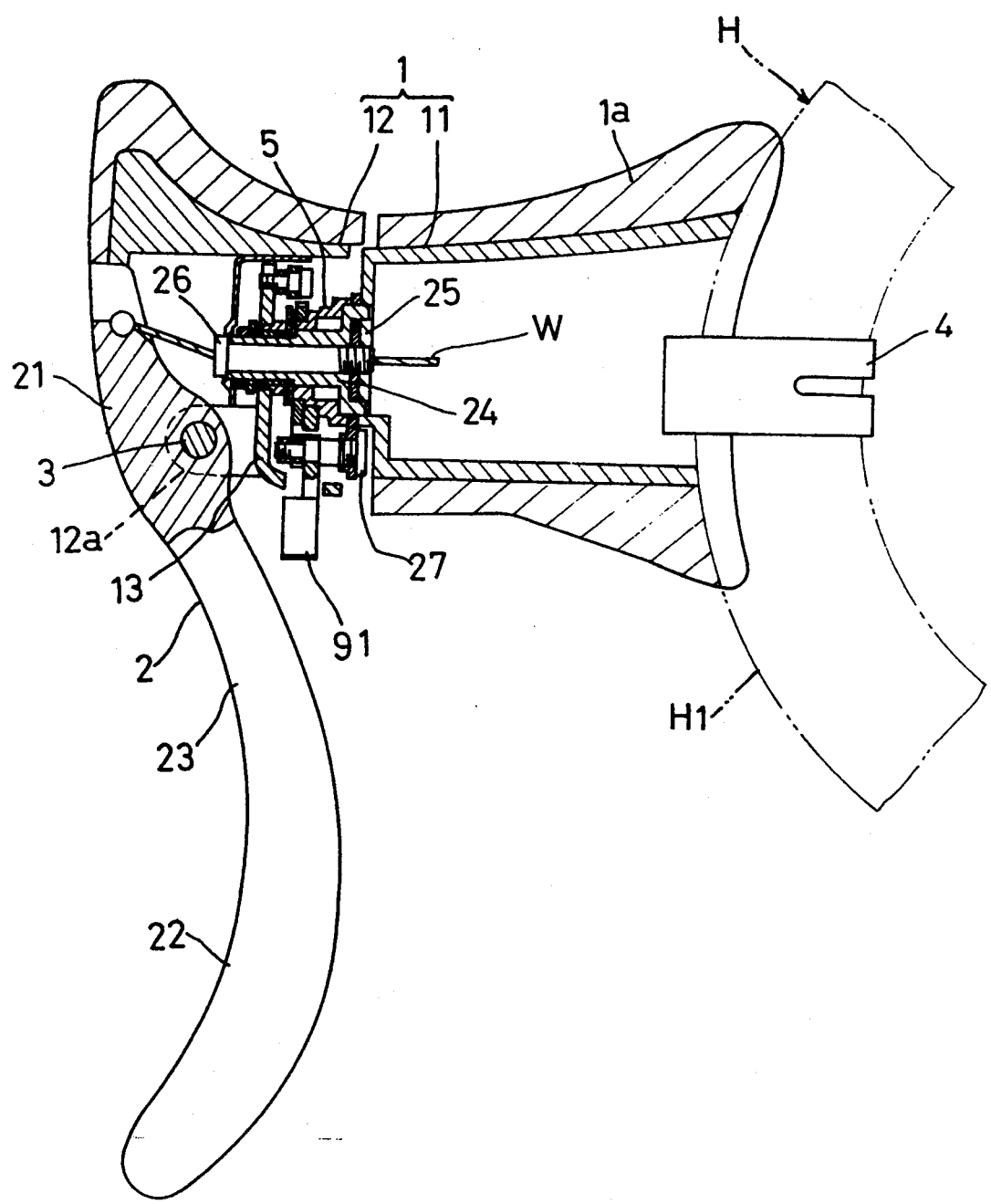
FIG. 11 is a front view in vertical section of a third embodiment of the invention.
Figure 12:
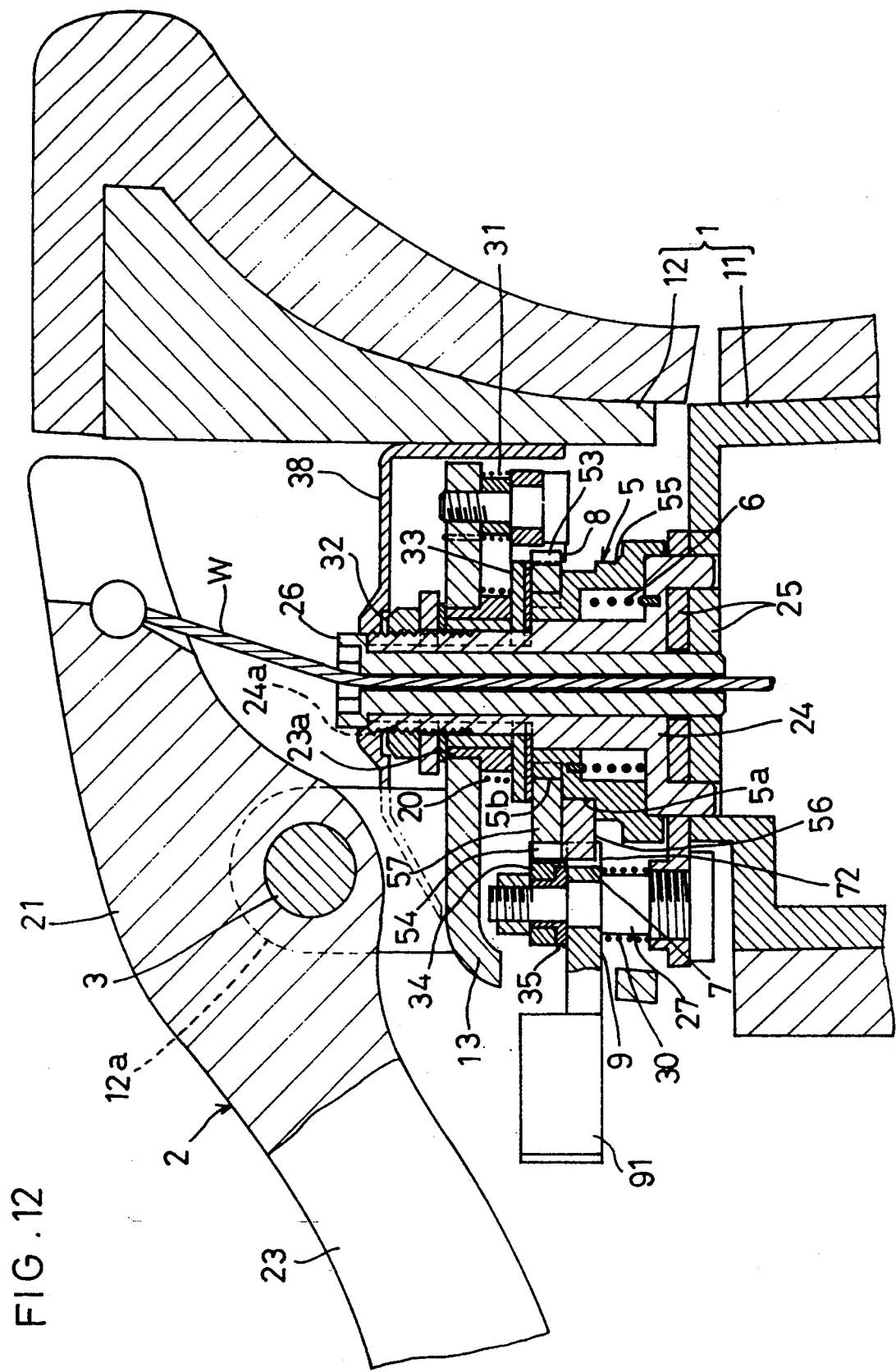
FIG. 12 is an enlarged sectional view of the third embodiment.
Figure 13:
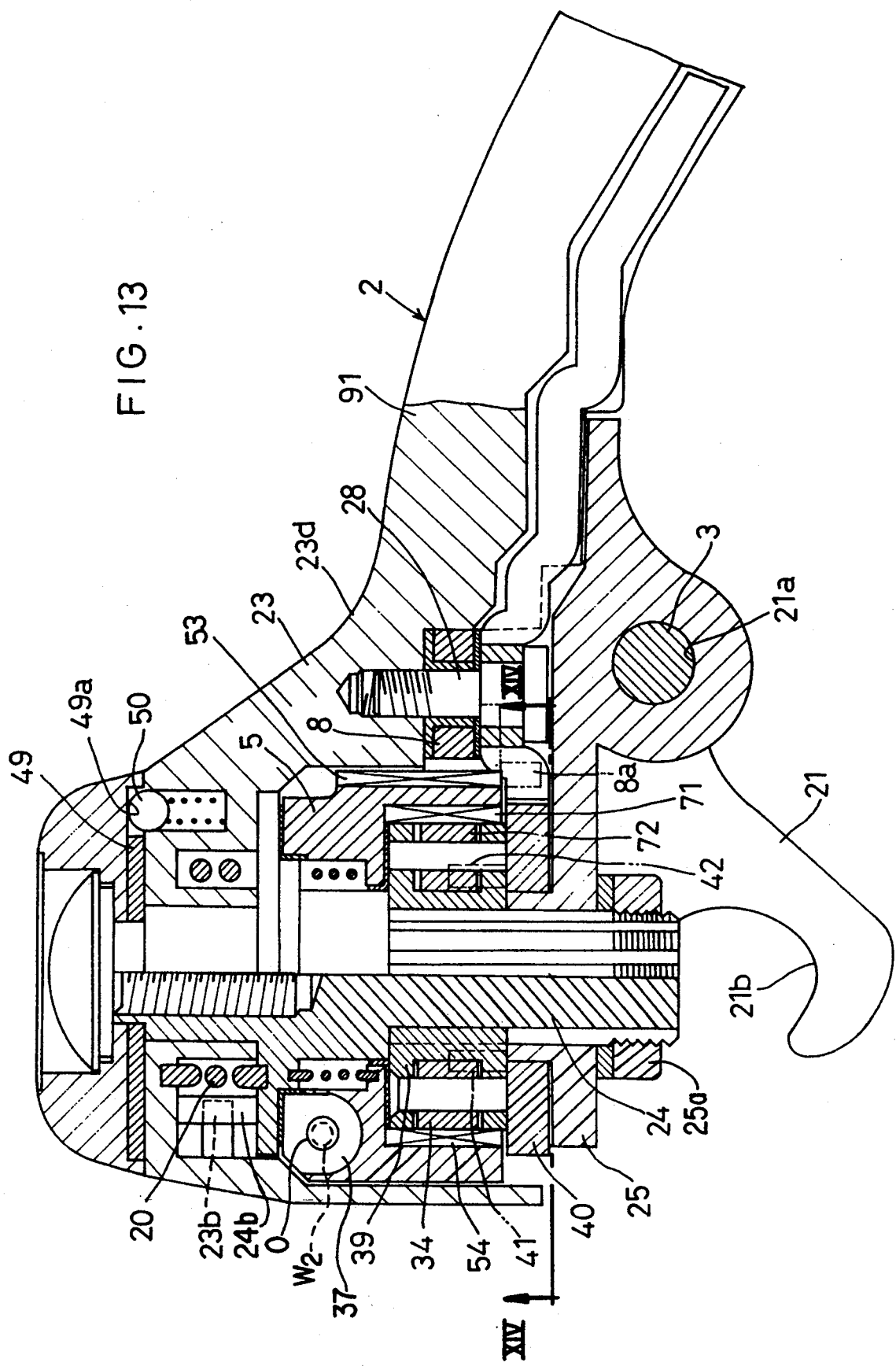
FIG. 13 is a section taken along a line VIII—VIII of FIG. 16.

A third embodiment will be described next with reference to FIGS. 11 and 12.

As is the second embodiment, the third embodiment is basically the same as the first embodiment, and only the different points will be described.

In the third embodiment, the bracket 1 comprises a fixing portion 11 and a lever support 12 formed separately from each other. The fixing portion 11 has support plates 25 secured to a wall thereof opposed to the lever support 12. The lever support 12 includes a planar lever supporting member 13 securely mounted therein and opposed to the supporting plates 25. A support shaft 24 is removably attached to the support plates 25 by a fixing screw 26. The support shaft 24 rotatably supports a wire takeup element 5 along with the planar lever supporting member 13. A position maintaining mechanism 7 is provided between the takeup element 5 and lever supporting member 13. The lever supporting member 13 includes a transmission element 8. A lever spring 20 is mounted between the lever supporting member 13 and support shaft 24 for returning the lever support 12 to the starting position. Thus, the lever support 12 is swingable, to effect change speed, in a direction perpendicular to the direction of pivotal movement about the lever axis 3 of the brake lever assembly 2.

The lever supporting member 13 includes a projection 12a for supporting the lever axis 3 which in turn supports the lever member 22. The lever support 12 includes a sleeve bearing (not shown) at one side thereof opposed to a wire guide groove 55 of the takeup element 5, for supporting the outer sleeve 0 which guides a change speed wire W1 engaged by a wire engaging portion 51 of the takeup element 5.

The support shaft 24 is formed hollow for receiving the brake wire W1 extending to the wire hook 21b.

This embodiment includes a tightening screw (not shown) for tightening the band element 4, which screw is inclined relative to the axis of the support shaft 24, as distinct from the first and second embodiments, to be turned from outside the bracket 1.

In the third embodiment, the brake lever assembly 2 is pivotable to the braking position about the lever axis 3 with a hand holding the curved portion H1 or bracket 1. This pivotal movement of brake lever assembly 2 pulls the brake wire W1 thereby to brake the bicycle. The lever member 22 may be swung forward from the starting position in the direction perpendicular to the direction of pivotal movement of the brake lever assembly 2, with the lever member 22 rigidly connected to the lever support 12 through the lever axis 3, to provide a selected low speed. Upon release, the lever member 22 returns to the starting position under the force of lever spring 20 acting on the lever support 12. When swinging the lever member 22 with a hand holding the bracket 1, the hand may be twisted at the wrist to turn the lever support 12. The control lever 91 may be swung forward from its starting position to provide a selected high speed, and returns to the starting position under the force of lever spring 30 upon release.

A fourth embodiment will be described next with reference to FIGS. 13 through 16.

The fourth embodiment is also basically the same as the first embodiment.

In the fourth embodiment, the base 21 includes support plates 25 secured to a wall thereof opposed to the intermediate portion 23, and a support shaft 24 is removably attached to the support plates 25 by a nut 25a. The brake lever assembly 2 has a face 2a. The support shaft 24 rotatably supports, besides the intermediate portion 23, a wire takeup element 5 defining a plurality of driven portions 53 peripherally thereof and a plurality of engaging portions 71 on an inside peripheral wall thereof. The takeup element 5 is urged in a wire-unwinding direction by a return spring 6 provided along with a lever spring 20. The support shaft 24 further supports a holder sleeve 39 to be relatively unrotatable, for swingably supporting a pawl-like engaging member 72 and a limiter pawl 34. A spring 47 is provided for urging the engaging member 72 toward the engaging portions 71, while a spring (not shown) is provided for urging the limiter pawl 34 away from the control recesses 54. A transmission element 8 and a control lever 91 are pivotally connected to the intermediate portion 23 through a pivotal axis 28 (a second pivot axis) extending parallel to the support shaft 24. The speed change control lever 91 has a speed change lever body 91h. The control lever 91 includes a control projection 91b projecting from the proximal end thereof in a direction opposite to a control portion thereof. The control lever 91 includes a first face 91d and a second face 91e. The transmission element 8 includes an engaging projection 8a at a distal end thereof. The support shaft 24 supports a control plate 40 mounted thereon to be relatively unrotatable. The control plate 40 includes engaging projections 41 and 42 for engaging the engaging member 72 and limiter pawl 34, respectively, to move the engaging member 72 out of engagement and the limiter pawl 34 toward its engaging position when the control lever 91 is swung forward (clockwise in FIG. 14). The control plate 40 further includes a first cam surface 43 for contacting the engaging projection 8a of the transmission element 8, and a second cam surface 44 for engaging the control projection 91b. This allows change speed to be effected with the swinging movement in the direction perpendicular to the direction of pivotal movement of the brake lever assembly 2.

Figure 15:
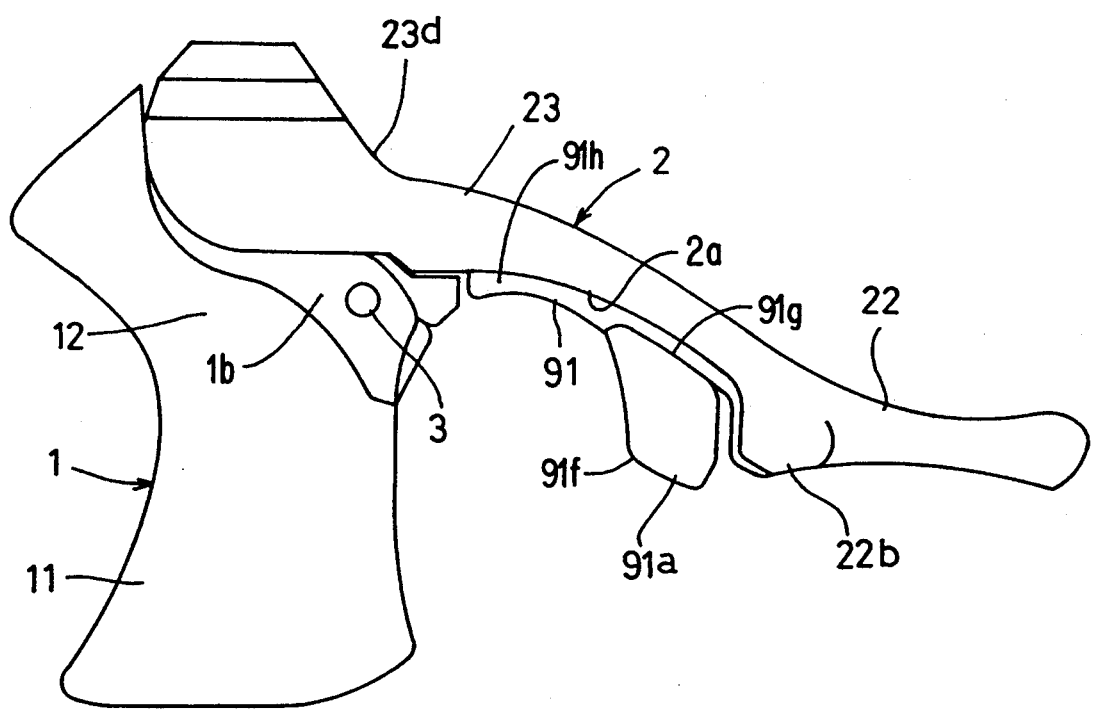
FIG. 15 is a side view of the control device.

The control lever 91 is disposed in a recess 23e defined in a back face of the intermediate portion 23. Located at an extreme end region 91g of the control lever 91 is a control portion 91a. As shown in FIG. 15, its control portion 91a is disposed close to the lever member 22, projecting a face 91f toward the handlebar H relative to the intermediate portion 23 for facilitating operation. The control lever 91 has a starting position in which one lateral face of the control lever 91 contacts a side face of the recess 23e.

Figure 16:
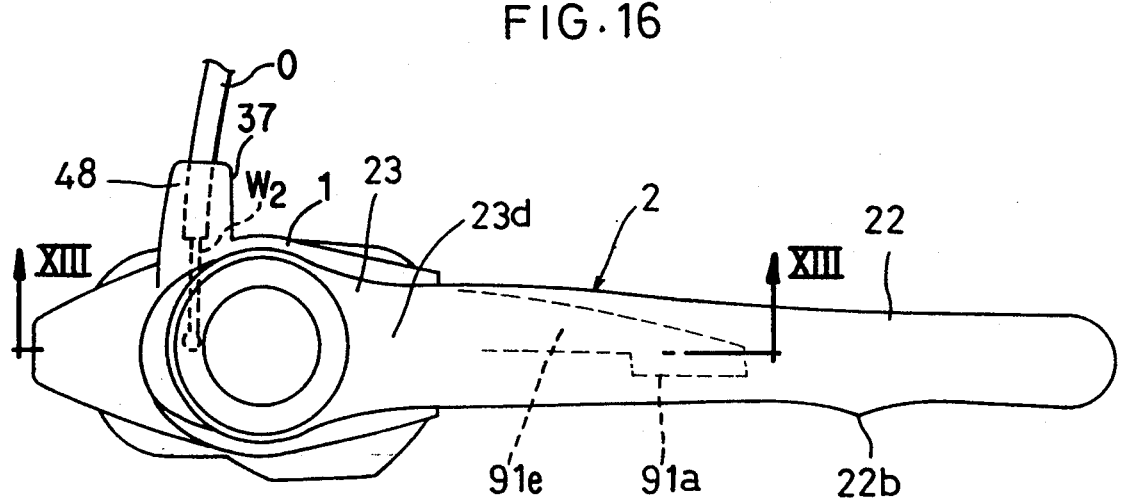
FIG. 16 is a top plan view of the control device.

The lever member 22 defines a broad bulge 22b projecting from a back face thereof adjacent the control portion 91a toward the handlebar H. This facilitates operation of the lever member 22 with a hand holding the curved portion H1 even if the cyclist has short fingers. As shown in FIG. 16, the bulge 22b is offset from the control portion 91a transversely of the lever member 22, so that the control portion 91a is not obstructive to the change speed operation with fingers contacting the bulge 22b.

The intermediate portion 23 has a proximal portion 21 projecting laterally outwardly through a curved portion 23d, to define an outer configuration from the curved portion 23d to the lever support 12 of the bracket 1 to facilitate gripping. Thus, the cyclist can easily grip the fixing portion 11 of the bracket 1 together with the lever support 12 and the curved portion 23d.

A sleeve support 48 is provided adjacent an extreme end of the proximal portion 21 for supporting an outer sleeve 0 which guides a change speed wire. This sleeve support 48 is located at a position out of interference with the hand gripping the lever support 12 and curved portion 23d. Thus, the cyclist can grip the lever support 12 and curved portion 23d without being obstructed by the sleeve support 48.

A stationary plate 49 defining a recess is mounted adjacent the distal end of the support shaft 24 to be unrotatable relative thereto. The intermediate portion 23 includes, adjacent its proximal end, a ball 50 for engaging the recess 49a and a spring for urging the ball 50. This construction acts to maintain the lever member 22 in a neutral position opposed to the foremost end of the curved portion H1, and to prevent the lever member 22 from swinging with the control lever 91 when the latter is operated.

A setting portion 24b is provided at an intermediate position of the support shaft 24 for setting the starting position of the lever member 22. The intermediate portion 23 includes an abutment 23b for contacting the setting portion 24b.

While the control lever 91 may be returned under the force of lever spring 30, the control lever 91 is returned by a different arrangement in the fourth embodiment. That is, the forces of the spring 47 urging the engaging member 72 and of the spring urging the limiter pawl 34 are applied through the engaging projections 41 and 42 to the control plate 40 for turning the control plate 40 in the direction (clockwise in FIG. 14) opposite to the direction of return of the control lever 91. The control plate 40 imparts the force from the second cam surface 44 to the control projection 91b to return the control lever 91.

In the fourth embodiment, as in the first embodiment, the brake lever assembly 2 is pivotable to the braking position with a hand holding the curved portion H1 or bracket 1. The brake lever assembly 2 makes a pivotal movement on the lever axis 3 (a first pivot axis), located at an upper end region 1b of the bracket 1, with the lever member 22 and intermediate portion 23 rigidly interconnected through the support shaft 24 and support plates 25. This pivotal movement of brake lever assembly 2 pulls the brake wire W1 thereby to brake the bicycle. The lever member 22 may be swung forward from the starting position to provide a selected low speed, and returns to the starting position under the force of lever spring 20 upon release. The control lever 91 may be swung forward from its starting position to provide a selected high speed, and returns to the starting position under the forces of the spring urging the engaging member 72 and of the spring urging the limiter pawl 34 upon release.

Figure 14:
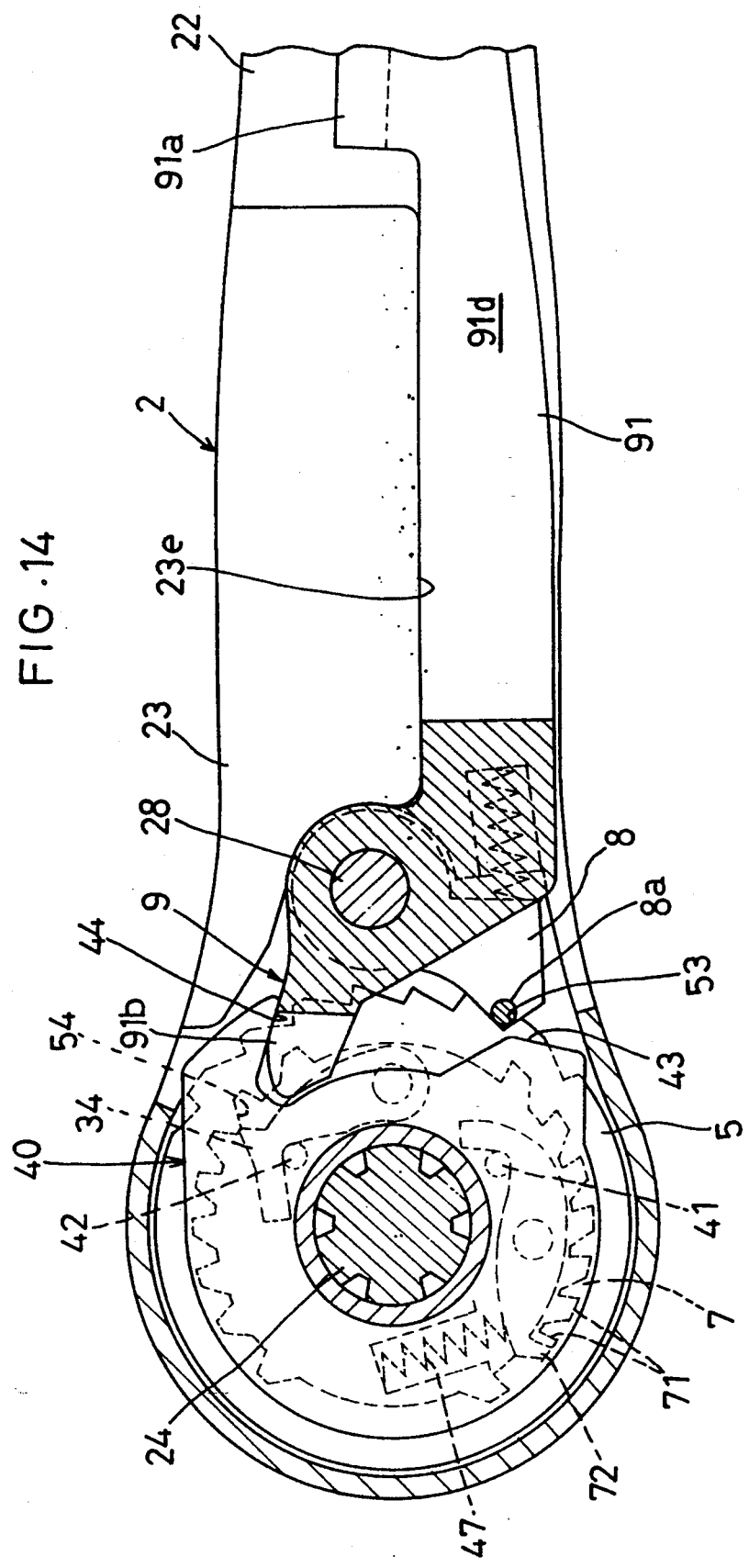
FIG. 14 is a section taken along a line IX—IX of FIG. 13.

The way in which this embodiment works to effect change speed will briefly be described next. When the lever member 22 is swung forward in the clockwise direction with the transmission element 8 engaging one of the driven portions 53 as shown in FIG. 14, the transmission element 8 drives the takeup element 5 forward, and the engaging member 72 moves away from the engaging portions 71. As a result, the change speed wire is pulled to provide a selected low speed. When the lever member 22 is released, the lever member 22 returns to the starting position under the force of lever spring 20.

When the control lever 91 is swung clockwise in FIG. 14, the control plate 40 is driven through the control projection 91b and the second cam surface 44 to rotate counterclockwise. Then the engaging projection 42 of the control plate 40 presses the limiter pawl 34 toward the control recesses 54, whereby the tip end of the limiter pawl 34 advances into one of the control recesses 54. The engaging projection 41 of the control plate 40 moves the engaging member 72 out of engagement with an engaging portion 71. As a result, the takeup element 5 returns counterclockwise by an amount corresponding to the gap between the limiter pawl 34 and control recess 54, i.e. within one pitch of the engaging portions 71. When the control lever 91 is released to return counterclockwise, the control plate 40 rotates clockwise to release the limiter pawl 34 out of engagement with the control recess 54 and to move the engaging member 72 into engagement with an adjacent engaging portion 71.

The control lever 91 is pivoted to the intermediate portion 23 of brake lever assembly 2 so that, when the lever member 22 is swung forward to effect speed change, the control lever 91 is swung with the lever member 22 instead of moving relative to the latter. This allows the lever member 22 to be swung without being obstructed by the control lever 91.

Since the lever member 22 includes the bulge 22b projecting from the back face thereof, a cyclist having somewhat shorter fingers than average can carry out the change speed operation by utilizing the bulge 22b. Further, this bulge 22b projects further outwardly than the control portion 91 of the control lever 91 to facilitate the speed change operation.

The control portion 91b of the control lever 91 is disposed adjacent the lever member 22. This allows the cyclist to operate the control lever 91 easily with the hand gripping the curved portion H1 or bracket 1.

Further, the curved portion 23d is provided adjacent the proximal end of the intermediate portion 23 of brake lever assembly 2 as described hereinbefore. This allows the cyclist to readily grip the curved portion 23d and its vicinity from the lever support 12 of bracket 1 without being obstructed by the sleeve support 48.

In the first to fourth embodiments so far described, the lever member 22 is swingable in the direction perpendicular to the direction of pivotal movement of the brake lever assembly 2, i.e. axially of the lever axis 3. Instead, the lever member 22 may be swingable in an inclined direction relative to the lever axis 3. It will serve the purpose if the lever member 22 is swingable in a direction different from the direction of pivotal movement of the brake lever assembly 2 within a range that does not result in a speed change at times of braking. Further, in the described embodiments, the control lever 91 is provided besides the brake lever assembly 2, with the lever member 22 swingable to provide low speeds and the control lever 91 swingable to provide high speeds. The control lever 91 may be omitted, with the lever member 22 swingable in one direction to provide low speeds and in the other to provide high speeds.

In this case, the lever member 22 may be returned to the starting position at all times or may not be returned thereto. The described embodiments include the position maintaining mechanism 7 for positioning the lever member 22 to correspond to a selected speed. The position maintaining mechanism may be omitted, and the lever member 22 may be maintained in an operative position by applying a resistance to its swinging movement in the direction different from the direction of pivotal movement of the brake lever assembly 2, to overcome the force of the return spring of the speed changer.

Figure 17:
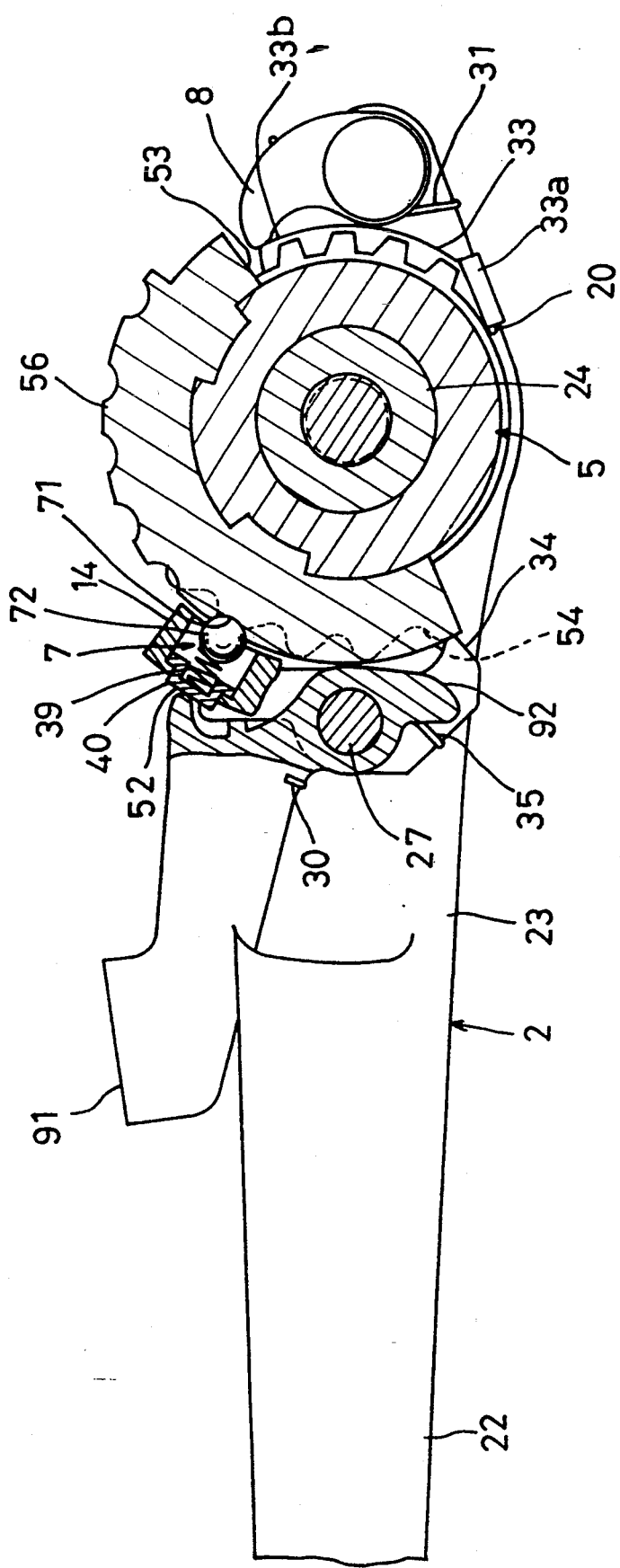
FIG. 17 is a section corresponding to FIG. 14.

Further, the described embodiments include the return spring 6 for rotating back the takeup element 5. For example, the return spring of the speed changer may be utilized to rotate back the takeup element 5. Therefore, the return spring 6 provided between the takeup element 5 and bracket 1 is not absolutely necessary.

Where the position maintaining mechanism 7 is provided, the engaging member 72 of the position maintaining mechanism 7 may be formed integrally with the control lever 91 as in the first to third embodiments, or may be formed separately from the control lever 91 as in the fourth embodiment. Where the engaging member 72 is formed separately in the first to third embodiments, the engaging member 72 may comprise a ball as shown in FIG. 17, for example. In this case, a presser spring 45 and a spring bearing 46 are disposed between the engaging member 72 and control lever 91 for urging the engaging member 72 toward the engaging portions 71. The fixing portion 11 includes a support piece 15 for supporting the engaging member 72, presser spring 45 and spring bearing 46.

In the first to third embodiments, the engaging portions 71 of the position maintaining mechanism 7 are formed peripherally of the takeup element 5. Instead, the engaging portions may be displaced axially of the takeup element 5. For example, a circular interlocking plate having a smaller diameter than the takeup element 5 and defining the engaging portions 71 peripherally thereof may be attached to one end of the takeup element 5. In this case, the control lever 91 is supported by the position setter 10 or the spring bearing plate 33 mounted adjacent the distal end of the support shaft 24. This construction allows the takeup element 5 to be small, and the control lever 91 to be supported at a position closer to the axis of the takeup element 5, thereby to realize a compact overall apparatus.

In the first to third embodiments, the first setting portion 10a for setting the starting position of the lever member 22 may be formed integrally with the fixing portion 11. The second setting portion 91 for setting the starting position of the control lever 91 may be provided on the fixing portion 11.

Further, where the position maintaining mechanism 9 is provided in the first to third embodiments, the control lever 91 may be omitted from the position maintaining mechanism 9 and, though not illustrated in the drawings, the fixing portion 11 may support a control pin or push button spring-loaded in a returning direction. The control pin or push button is operable to move the engaging member 72 out of engagement with the engaging portions 71. The position maintaining mechanism 9 is not limited to the described construction.

The control device according to the present invention may be mounted on a flat handlebar or other handlebars than the dropped handlebar. In this case, the bracket 1 may have a shape not suited for gripping.

According to the present invention, as described, there are provided the bracket 1 includes the fixing portion 11 and lever support 12, and the brake lever assembly 2 including the base 21 supported by the lever support 12. The brake lever assembly 2 is pivotable relative to the bracket 1 between a braking position and an inoperative position. The brake lever assembly 2 also includes the lever member 22 swingable relative to the fixing portion 11 in a direction different from the direction of pivotal movement of the brake lever assembly 2 to effect change speed. Thus, braking and speed change are effected without requiring a special lever for speed change purposes. This realizes a simple, inexpensive and small construction, and eliminates the possibility of fingers becoming caught and injured by the speed change lever.

Since speed change is effected through the lever member 22, the cyclist may simply swing the lever member 22 in the direction different from the direction of pivotal movement of the brake lever assembly 2 without removing the hand from the brake lever assembly 2. When speed change is effected immediately after decelerating the bicycle by operating the brake lever assembly 2, the change from braking to speed change can be made with a minimum time lag, thereby reliably controlling the running speed of the bicycle.

According to the present invention, the brake lever assembly 2 is divided into the base 21 and lever member 22, the latter being swingable to effect change speed. This involves only a change in the construction of the brake lever portion of the brake control device, which promotes simplicity and low cost of the construction.

Further, according to the present invention, the bracket 1 is divided into the fixing portion 11 and lever support 12, the latter supporting the lever member 22 of brake lever assembly 2 to be swingable to effect speed change. Thus, to effect speed change, the lever member 22 may be swung with the lever support 12 by twisting the hand holding the bracket 1 at the wrist, which greatly facilitates the speed change operation.

What is claimed is:

1. A control device for mounting on a bicycle handlebar, said control device comprising:
   (A) brake lever means including:
      (a) a support member adapted to be fixed to the handlebar and having a lateral side face defining a grip portion,
      (b) a first pivot axis located at an upper end region of said support member, and
      (c) a brake lever having a base portion pivotably connected to said support member through said first pivot axis, a curved intermediate portion extending from said base portion, and a control grip portion extending from said intermediate portion, said lever also having a brake lever face for opposing the handlebar; and
   (B) speed change lever means mounted in proximity to said brake lever means, said speed change lever means including:
      (a) a second pivot axis extending in a direction substantially perpendicular to said first pivot axis, and
      (b) a speed change control lever pivotably connected to said second pivot axis and having at least first and second speed change control positions, said speed change control lever having a speed change lever body extending along said face of said brake lever, said speed change lever body having a first face for opposing the handlebar and a second face opposite to said first face, and wherein said speed change lever body includes a control portion; and wherein said second face of said speed change lever body is overlapped by said brake lever face.

2. A control device as in claim 1, wherein said control portion of said speed change lever body is located at an extreme end region of said speed change lever body, and wherein said control portion of said speed change lever body has a face extending toward the handlebar.

3. A control device as in claim 1, wherein said second pivot axis is located at said upper end region of said support member.

4. A control device as in claim 1, wherein said second pivot axis is mounted on said brake lever.

5. A control device as in claim 1, wherein said control device includes a second speed change control lever.

6. A control device as in claim 5, wherein said brake lever includes said second speed change control lever.

* * * * *